Sept. 7, 1937.  J. H. FEDELER  2,092,057
FOOD PRODUCT AND METHOD FOR MAKING THE SAME
Filed May 15, 1934  3 Sheets-Sheet 2
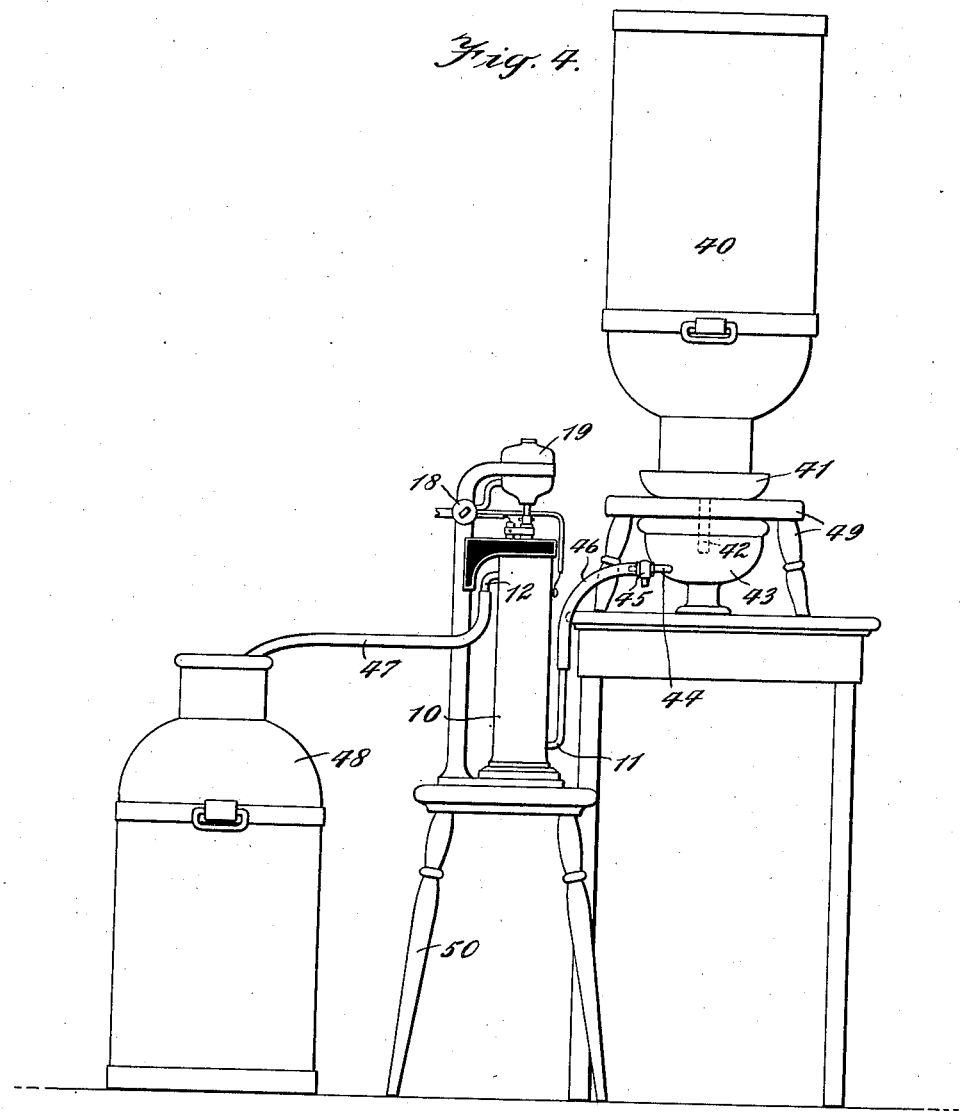
Inventor
John H. Fedeler,

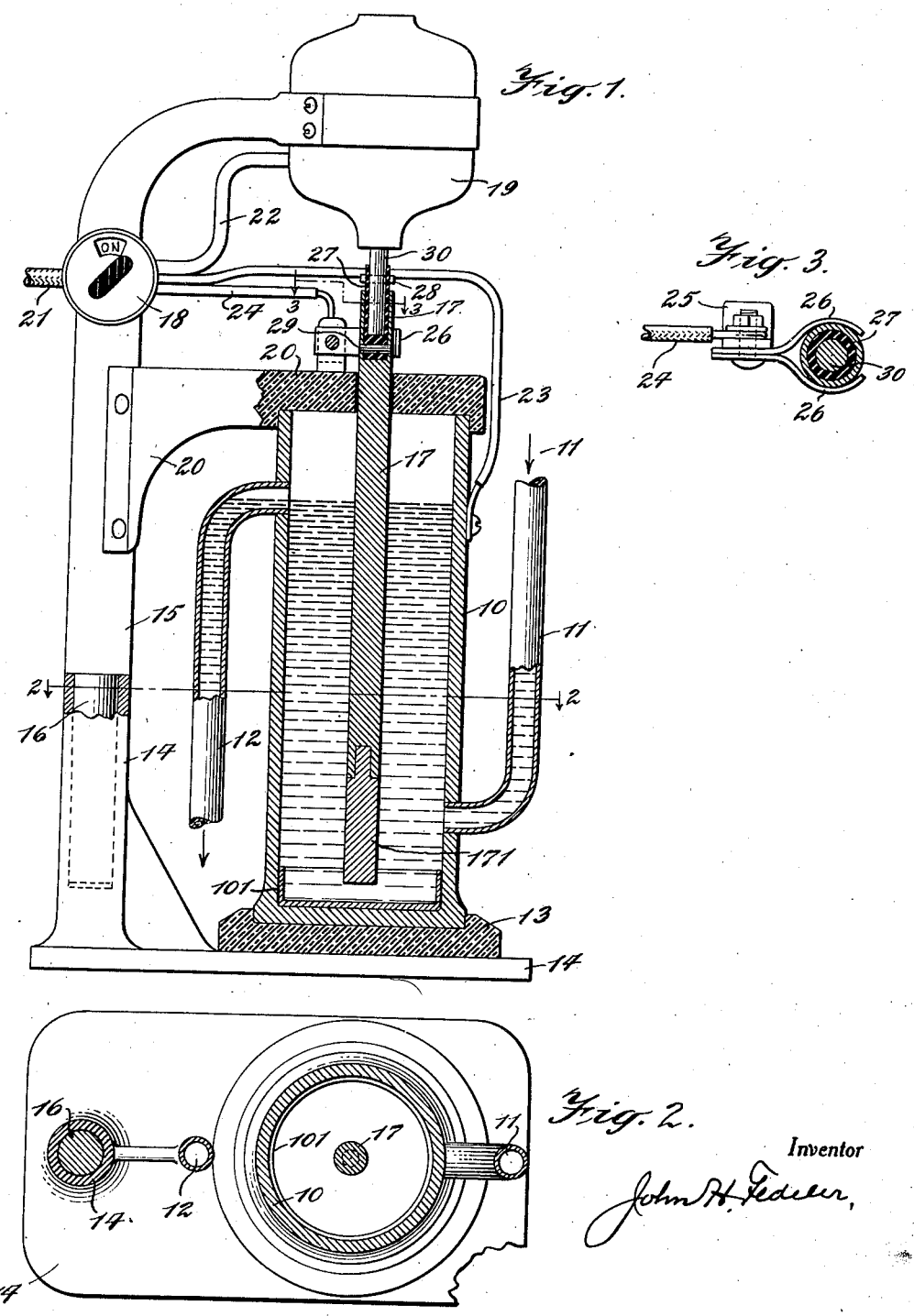

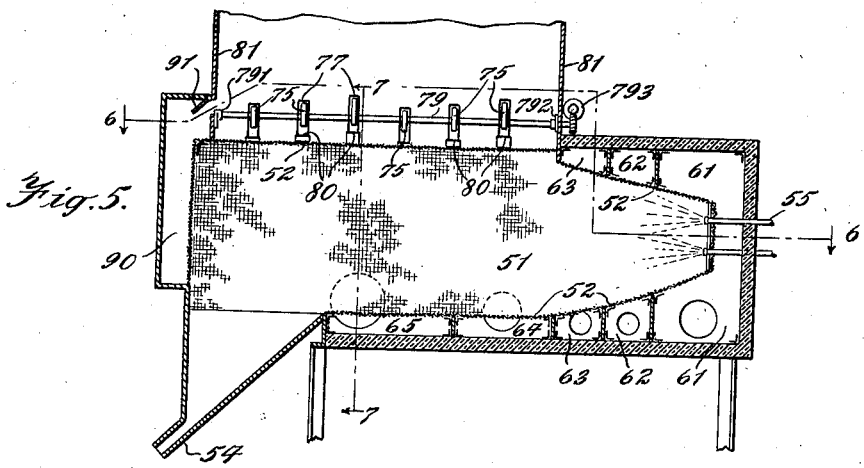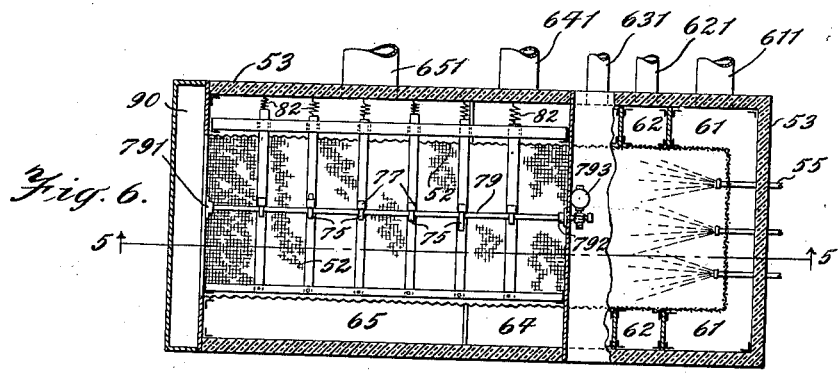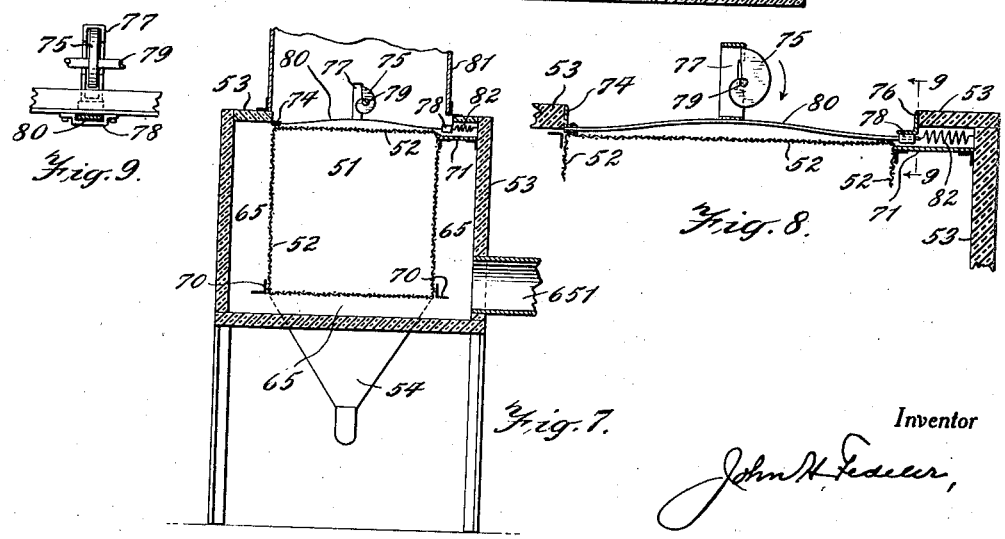

Patented Sept. 7, 1937

2,092,057

UNITED STATES PATENT OFFICE 2,092,057

FOOD PRODUCT AND METHOD FOR MAKING THE SAME

John H. Fedeler, New York, N. Y.

Application May 15, 1934, Serial No. 725,715

3 Claims. (Cl. 204—9)

This application relates to a novel and improved form of food product and also to a novel way of making that product. The invention will be best understood from the following description and the annexed drawings, in which I have shown one form of apparatus which may be employed in making the novel food product according to my method, and in which:

Fig. 1 is a side view of a portion of the apparatus used in one step of the method, parts being shown in elevation and other parts being broken away or shown in section;

Fig. 2 is a view taken approximately on the line 2—2 of Fig. 1;

Fig. 3 is a view taken approximately on the line 3—3 of Fig. 1;

Fig. 4 is an elevation of part of the apparatus including that shown in Fig. 1 and showing the use of that part in a continuous process;

Fig. 5 is a vertical view of a drying chamber taken approximately on the line 5—5 of Fig. 6;

Fig. 6 is a section taken approximately on the line 6—6 of Fig. 5;

Fig. 7 is a section taken approximately on the line 7—7 of Fig. 5;

Fig. 8 is a view on the same plane as Fig. 7 but on a larger scale and illustrating a part of the apparatus shown in that figure;

Fig. 9 is a fragmentary view taken approximately on the line 9—9 of Fig. 8.

It has been known for some time that certain foods which contain iron, copper, or other metals in digestible form create hemoglobin in the blood of human beings and other animals, and according to my invention it is possible to treat liquid food, as, for example, milk, in such a way as to impart thereto the desired amount of metal. The invention is not limited to milk, as I have found that it may be practiced with other liquid foods, as, for example, wine, but for the sake of convenience, I shall describe the invention as used with milk, because that is one of the most valuable liquid foods known.

Referring first to Figs. 1, 2, and 3, I have shown therein a container 10 in the form of a cylinder made of a suitable metal and provided with an inlet pipe 11 and an outlet pipe 12. The container may be mounted upon a suitable base 13, which in turn is supported on a holding frame 14 having a holder 15 extending upwardly therefrom and supported thereon by means of a shaft 16 extending into a socket on the frame.

Disposed within and preferably centrally of the container 10 is an electrode 17, which, for the sake of illustration, I shall assume is made of iron and which may have a part thereof made of copper, as shown diagrammatically at 17¹. Other suitable metals may be used as found expedient, and the electrode may be made of one metal or of several, as desired. The opposite electrode is formed by the metal container 10, and preferably the electrode 17 is rotated within the liquid in the container. Certain liquids, such as milk, will adhere to an electrode unless constantly stirred, and I have found that the means shown here is sufficient for the purpose of agitating the milk enough to prevent its adhering in substantial quantity to the electrodes.

I have shown a switch 18 which may be used for controlling current passing to a motor 19 mounted above a cap 20, this cap providing a cover for the container and having a hole therein through which the electrode 17 passes. Current may be led to the motor through the switch by suitable conductors shown diagrammatically as a cable 21, and from the switch a cable 22 may lead to the motor and other conductors 23 and 24 may lead to the respective electrodes. Since the electrode 17 will be rotating when in operation, I provide a brush holder 25 to which are secured brushes 26 adapted to contact with the electrode and thus form an electrical connection therewith.

The electrode 17 may be secured to the motor by means of an insulator 27 having a pin 28 passing therethrough and also passing through the shaft 30 of the motor, a second pin 29 securing the insulator to the electrode.

Not only may the electrode 17 be composed of different kinds of metal if desired, but, likewise, the container 10, which normally will be composed of iron, may have metal disks or washers 10¹ formed of other metals. The specific arrangement and construction of the various electrodes will depend to some extent upon the kind of current which is being used. I have found, for example, that when an electric current is passed through milk from an iron electrode, the metal of that electrode will be found to be present in the milk. Where alternating current is used, milk may then be treated by adding metal thereto from both electrodes, whereas with direct current most of the metal would probably come from one electrode.

It will be seen that the apparatus which I have described above will serve not only to add a suitable metal or metals to the milk, but will also agitate it so as to prevent adhering of the milk to the electrodes.

In Fig. 4 I have shown an apparatus by which the foregoing treatment may be carried on con-